US012131335B2

(12) United States Patent
Giera et al.

(10) Patent No.: US 12,131,335 B2
(45) Date of Patent: Oct. 29, 2024

(54) AUTOMATED EVALUATION OF ANTI-COUNTERFEITING MEASURES

(71) Applicant: Lawrence Livermore National Security, LLC, Livermore, CA (US)

(72) Inventors: Brian Giera, San Mateo, CA (US); Kerry G. Krauter, Livermore, CA (US); Brian Matthew Wihl, Pleasanton, CA (US); Michael E. Zelinski, Oakland, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 565 days.

(21) Appl. No.: 17/028,897

(22) Filed: Sep. 22, 2020

(65) Prior Publication Data

US 2022/0092609 A1   Mar. 24, 2022

(51) Int. Cl.
*G06Q 30/018*   (2023.01)
*G06N 3/04*   (2023.01)
*G06N 20/00*   (2019.01)
*G06V 20/20*   (2022.01)

(52) U.S. Cl.
CPC ............ *G06Q 30/0185* (2013.01); *G06N 3/04* (2013.01); *G06N 20/00* (2019.01); *G06V 20/20* (2022.01)

(58) Field of Classification Search
CPC ............................ G06Q 30/0185; G06V 20/95
See application file for complete search history.

(56) References Cited

U.S. PATENT DOCUMENTS

| 8,712,163 | B1 * | 4/2014 | Osheroff | G06V 30/148 |
| | | | | 424/467 |
| 2012/0273564 | A1 * | 11/2012 | Mercolino | G07D 7/20 |
| | | | | 235/487 |
| 2017/0032285 | A1 * | 2/2017 | Sharma | G06N 3/084 |
| 2017/0287147 | A1 * | 10/2017 | Takahashi | G06T 7/35 |

(Continued)

FOREIGN PATENT DOCUMENTS

| CN | 111160102 A | * | 5/2020 | ......... G06K 9/00288 |
| CN | 108898127 B | * | 3/2022 | ......... G06K 9/00214 |
| RU | 2425757 C1 | * | 8/2011 | |

(Continued)

OTHER PUBLICATIONS

Tyagi, Performance evaluation of machine learning for credit card fraud detection (Year: 2019).*

(Continued)

*Primary Examiner* — Sangeeta Bahl
(74) *Attorney, Agent, or Firm* — Perkins Coie LLP

(57) ABSTRACT

A system for evaluating the effectiveness of an anti-counterfeiting measure employed for an item is provided. The system trains a classifier to indicate whether the anti-counterfeiting measure of an evaluation item is genuine or counterfeit. For evaluation items that have been classified as genuine or counterfeit, the system applies the classifier to determine whether the anti-counterfeiting measure of that evaluation item is genuine or counterfeit. The system then generates an effectiveness metric that indicates whether the anti-counterfeiting measure is effective based on evaluation items that are assessed as being genuine whose anti-counterfeiting measures are classified as being counterfeit.

9 Claims, 8 Drawing Sheets

(56) References Cited

U.S. PATENT DOCUMENTS

2019/0236614 A1* 8/2019 Burgin .................. G06V 10/82
2019/0378050 A1* 12/2019 Edkin .................. G06N 20/20

FOREIGN PATENT DOCUMENTS

WO  WO-2020108251 A1 *  6/2020  ......... G06K 17/0022
WO  WO-2021179157 A1 *  9/2021

OTHER PUBLICATIONS

Global trade in fake goods worth nearly half a trillion dollars a year—OECD & EUIPO, Apr. 18, 2016. <www.oecd.org/industry/global-trade-in-fake-goods-worth-nearly-half-a-trillion-dollars-a-year.htm>.

Authentic Vision, "Solutions—Protect your products and engage and inspire your customers". www.authenticvision.com/solutions/, retrieved on Aug. 10, 2021.

Federal Aviation Administration. "FAA Unapproved Parts Notifications (UPN)." <ww.faa.gov/aircraft/safety/programs/sups/upn/>; Jun. 29, 2021.

Microfocus, "Global Product Authentication Service." www.microfocus.com/en-US/services/product-authentication-anti-counterfeit-services, retrieved on Aug. 10, 2021.

Shepard, Wade. "Meet the Man Fighting America's Trade War Against Chinese Counterfeits," Forbes Mar. 29, 2018. <www.forbes.com/sites/wadeshepard/2018/03/29/meet-the-man-fighting-americas-trade-war-against-chinese-counterfeits/?sh=785a88a31c0d>.

Tehranipoor, Mark M. et al. "Invasion of the Hardware Snatchers: Cloned Electronics Pollute the Market." IEEE Spectrum, Apr. 24, 2017. <spectrum.IEEE.org/computing/hardware/invasion-of-the-hardware-snatchers-cloned-electronics-pollute-the-market>.

United States Government Accountability Office, Report to the Chairman, Committee on Finance, U.S. Senate. "Intellectual Property Agencies Can Improve Efforts to Address Risks Posed by Changing Counterfeits Market." Jan. 2018, 55 pages.

* cited by examiner

AUTOMATED EVALUATION OF ANTI-COUNTERFEITING MEASURES

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

The widespread adoption of e-commerce to sell goods has been accompanied by a proliferation of the counterfeiting of goods. When goods are sold at a physical store, the store owner typically has an interest in ensuring that the goods are not counterfeit so that the reputation of the store is not damaged. However, when goods are sold through an online store, some sellers, who may be anonymous, sometimes sell counterfeit goods for a fraction of the cost of the genuine goods. Even if the reputation of the online store is damaged, the seller can simply create a new online store and continue selling counterfeit goods to unsuspecting consumers.

Counterfeiting is not limited to the sale of goods via e-commerce. Rather, the sale of counterfeit goods permeates all aspects of the global economy, including money and government bonds, legal documents, and all types of consumer goods such as electronic parts and finished products, pharmaceuticals, artwork, luxury fashion items, and software. Indeed, counterfeiting represents the largest criminal enterprise in the world. The worldwide sale of counterfeit goods is estimated to exceed $1.7 trillion per year and is expected to grow significantly in the next few years.

The damage caused by counterfeiting is not limited to lost profits and damaged reputations. The use of counterfeit goods can have dire consequences. The consequences have included failure of critical vehicle parts (e.g., aircraft parts); malicious software, firmware, and hardware in electronics (resulting, e.g., in theft of trade secrets and money); toxic cosmetics and pharmaceuticals; adulterated foods; defective medical instruments; and support of organized crime networks.

Despite domestic and international laws, the responsibility for protecting intellectual property, genuine goods, or legal tender ultimately falls on the producers of the genuine goods, such as owners of intellectual property, sellers of genuine goods, and issuers of legal tender. The producers of genuine goods typically combat counterfeiting using a variety of anti-counterfeiting measures. The anti-counterfeiting measures may include:

Discernible logo
Engineered packaging (e.g., tamper-evident seals)
Color-shifting inks and security pigments
Holograms
Microprinting
QR codes, barcodes, and RFID tags
Restricted vending (e.g., via limited physical or online stores)
Database tracking Product and packaging designers typically rely on their intuition when applying and developing anti-counterfeiting measures. Furthermore, protocols for authenticating goods, if they exist, are typically limited to visual inspection by the end user. In such cases, covert anti-counterfeiting measures are not involved in the authentication process.

The effectiveness of anti-counterfeiting measures, including the effectiveness of the interplay between anti-counterfeiting measures, is not well understood. For example, if a product includes both overt measures (e.g., logos) and covert measures (e.g., tamperproof seals), consumers may authenticate the product by focusing on accurately duplicated overt measures and not considering poor duplications of the covert measures. In such a case, the covert measures may not be effective. As another example, if a product contains many covert measures, consumers may authenticate the product by focusing on them as a whole and not focusing on each one individually. In such a case, too many covert measures may not be effective. As another example, a product designer relying on intuition may not be able to accurately assess the effectiveness of proposed anti-counterfeiting measures.

DETAILED DESCRIPTION

Figure 1:
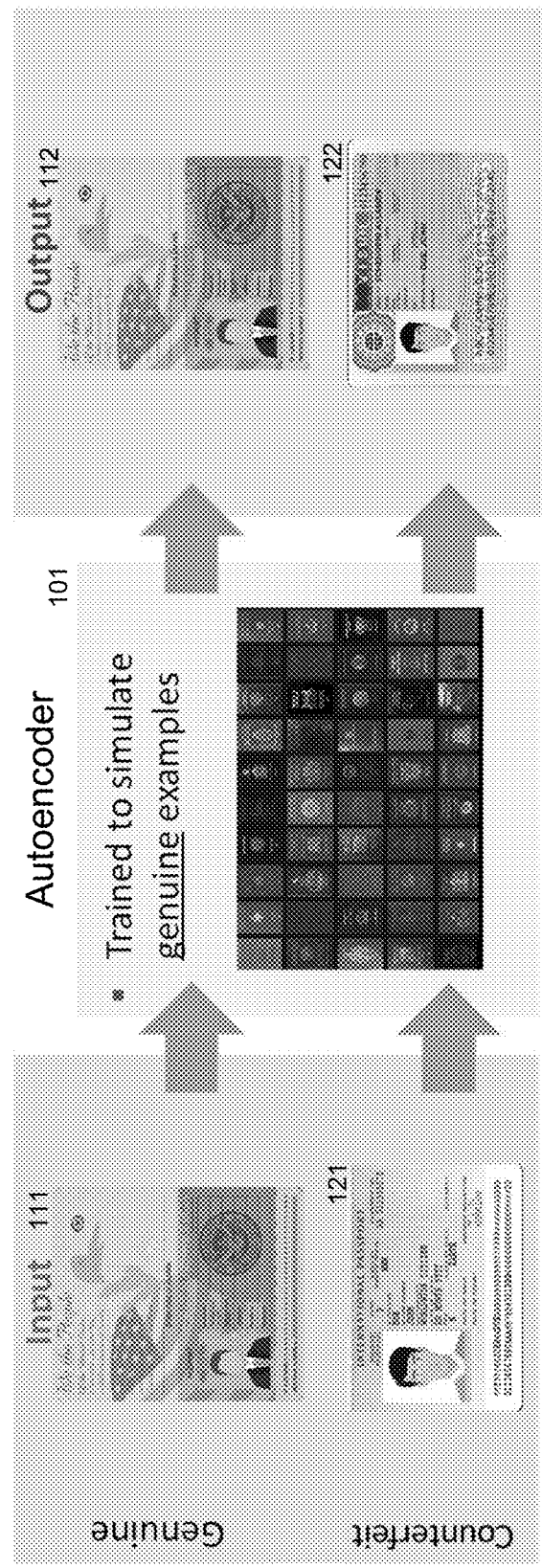
FIG. 1 is a block diagram that illustrates the operation of the assessment system in some embodiments.

Methods and systems for authenticating items and evaluating the effectiveness of anti-counterfeiting measures are provided. In some embodiments, an assessment and evaluation (A&E) system includes an assessment system and an evaluation system. The assessment system derives features from a target item and employs an assessment machine learning system to determine whether the target item is genuine. The features may be derived from sensors such as cameras, RFID readers, chemical sensors, material thickness sensors, weight sensors, and so on. For example, if the target item is a passport, the derived features may include an image of the passport, dimensions of the passport, and so on. The assessment machine learning system may be trained using genuine training items and, depending on the machine learning algorithm, counterfeit training items. The assessment machine learning system inputs the derived features and outputs an indication of whether the target item is genuine. As used herein, "goods" and "items" are used interchangeably and include anything that can have any aspect of it assessed (such as whether it is counterfeit) and that may include anti-counterfeiting measures. Also, the items may include anything having an anti-counterfeiting measure such as a designer bag or clothing with a difficult-to-duplicate logo and an RFID tag, a prescription drug in a unique shape or with an added inert chemical, a gold coin with a logo of the minter, currency or checks with color-shifting ink or a security thread, and so on.

The evaluation system evaluates the effectiveness of anti-counterfeiting measures (target measures) when using the assessment system to authenticate target items. For example, if the target item is a passport and the target measure is wavy lines across the bottom of the passport, the evaluation system generates data to indicate whether the presence of wavy lines on a passport is effective as an anti-counterfeiting measure when passports are authenticated by the assessment system. The evaluation system inputs evaluation items that are target items processed by the assessment system, such as a passport processed by an immigration service at an airport and assessed to be genuine or counterfeit. The evaluation system may employ various evaluation techniques to evaluate the effectiveness of a target measure. The evaluation techniques may be used individually or in combination.

One evaluation technique, referred to as the "hot spot" evaluation technique, identifies differences between features of evaluation items relating to a target measure and features of a genuine item relating to that target measure. Differences that satisfy a counterfeit measure criterion (e.g., above a threshold difference) may indicate a counterfeit target measure and are referred to as "hot spots." The difference threshold may be adjustable be overinclusive or underinclusive in identifying a counterfeit target measure that is identifying some genuine target measures as counterfeit or identifying some counterfeit target measures as genuine. If counterfeit evaluation items have those hot spots, the target measure may be deemed effective because at least some counterfeiters cannot effectively replicate it. If counterfeit items have no hot spots, the target measure may be deemed ineffective because counterfeiters can effectively replicate it. However, if genuine evaluation items have those hot spots, the assessment system is not accurately processing target items. In such a case, the assessment system may need to be improved by employing a different architecture for the assessment machine learning system, training with more training data, training with a revised loss function, training with more iterations, and so on. Also, more features and/or more accurate features relating to the target measure (e.g., use of a camera with a higher resolution) can be used by the assessment system to improve accuracy.

Another evaluation technique, referred to as a clustering evaluation technique, generates clusters of evaluation items that have similar differences. If counterfeit evaluation items fall within the same cluster, those evaluation items may have originated from a common source, such as a group with a particular counterfeiting technique (albeit not an effective one). The knowledge that there is a common source may be helpful in tracking down the common source and/or focusing on improving the target measure. If both genuine and counterfeit evaluation items are in the same cluster, the assessment system may need to be improved as described above. The clustering evaluation technique may employ any of a variety of clustering techniques, such as a k-means.

Another evaluation technique, referred to as a classification evaluation technique, classifies evaluation items as having a target measure that is genuine or counterfeit. The classification evaluation technique may train a classifier using features derived from training items that have been labeled to indicate whether the target measure is counterfeit. To evaluate the effectiveness of the target measure, the classification evaluation technique applies the classifier to each evaluation item to classify it as having a target measure that is genuine or counterfeit. If only counterfeit evaluation items have counterfeit target measures, the target measure may be deemed to be effective. However, if a significant number of genuine evaluation items have a counterfeit target measure, the target measure may be deemed to be not very effective. In such cases, the assessment system may be improved as described above.

With any of the evaluation techniques, the evaluation system may generate an effectiveness metric to indicate the effectiveness of the target measure. For example, the effectiveness metric may be based on the number of genuine evaluation items that have a counterfeit target measure and the number of counterfeit evaluation items that have a genuine target measure.

In some embodiments, the assessment machine learning system may be based on an autoencoder that has been trained using genuine items. An autoencoder, which may be a convolutional neural network (CNN) or a generative adversarial network (GAN), is trained to input a feature (e.g., an image of a passport) and output the feature. For example, the autoencoder for passports may be training using a variety of passports such as from various countries, former passport designs, and so on. The training of the autoencoder is based on a loss function that seeks to minimize the differences between input features and output features. Once the autoencoder is trained, the autoencoder inputs features that are derived from a target item and outputs features that are very similar to the input target features when the target item is genuine and not similar when the target item is counterfeit. The assessment system may then output an indication of both the input features and the output features so that a manual assessment can be made as to whether the target item is genuine. For example, if the target item is a passport and an input target feature is an image of the passport, the assessment system may display the input image and the output image or an indication of hot spots to assist an immigration officer in determining whether the passport is genuine. The assessment system may also generate an authentication metric based on differences between the input features and the output features. For example, if the input feature is an image, the assessment system may generate a difference map indicating pixels of the images that are different and base the authentication metric on the percentage of pixels that are different, the differences in pixel values, groupings of pixels that are different, the differences in pixel values near an anti-counterfeiting measure, and so on. Continuing with the example, the assessment system may output the authentication metric to an immigration officer or output an indication whether the target item is genuine based on the authentication metric satisfying an authentication criterion (e.g., above a certain value).

In some embodiments, the classification evaluation technique may be based on a CNN trained to determine whether a target measure is counterfeit. The CNN inputs an input feature derived from a target item and outputs an indication of whether the target measure on the target item is counterfeit. The input features may include an image of the target item and non-image features such as its dimensions and weight. An input feature may also be a difference map generated by the assessment system or weights of a hidden layer of an autoencoder. The input features may also include images of only portions of the target item. For example, there may be a separate feature that is an image of the portion that includes the target measure or other anti-counterfeiting measures. Alternatively, the CNN may be used in conjunction with other machine learning techniques such as a support vector machine. In such case, the non-image features may be input to the support vector machine and the outputs of the support vector machine and the CNN may be combined into a final output. The CNN and the support vector machine may be trained in parallel. Rather than a CNN, the classification evaluation system may employ other types of machine learning techniques such as a neural network, reinforcement learning, a support vector machine, and so on. The classification evaluation system may employ a machine learning technique that outputs a probability that an anti-counterfeiting measure is genuine. The evaluation system may train a classifier that generates a classification for multiple anti-counterfeiting measures. In such a case, each evaluation item may be labeled with the classification of multiple anti-counterfeiting measures. Alternatively, a different classifier may be trained for each anti-counterfeiting measure.

Although the A&E system is described primarily in the context of counterfeiting, aspects of the A&E system may be used more generally to determine whether a target item satisfies a desired criterion, such as whether the target item has a defect. For example, an autoencoder may be trained using features derived from training items that satisfy the desired criterion and then applied to input features derived from a target item to determine whether the target item satisfies the desired criterion based on differences between the input features and the output features. The assessment system may generate a difference map and then generate a metric based on the differences. The assessment system may indicate that the desired criterion is satisfied based on the metric. For example, a product may be manufactured that inevitably has some variations in it, such as a gold bar that includes a border, a logo of the minter, a serial number, and so on. Because of a minting error, a gold bar may have a very wide border or a blurred logo. In such a case, the autoencoder can be used to identify that a gold bar has a defect in a manner similar to the way that a target item is identified as a counterfeit.

The A&E system may be used to evaluate the effectiveness of combinations of anti-counterfeiting measures. For example, the effectiveness of the combination of wavy lines on a passport and a seal superimposed on a photo of a passport may be evaluated. A classifier may be trained to classify whether a passport has counterfeit wavy lines and/or a counterfeit seal. The classes may be both genuine, counterfeit wavy lines and genuine seal, genuine wavy lines and counterfeit seal, and both counterfeit. If very few of the counterfeit passports are classified as having only counterfeit wavy lines or only counterfeit seals, but many of the counterfeit passports are classified as having both, then the combination of wavy lines and seals may be particularly effective. However, the reason why the combination is effective may not be well understood, possibly because the aspects of the passports that affect the assessments are hidden in the weights of the assessment machine learning system.

FIG. 1 is a block diagram that illustrates the operation of the assessment system in some embodiments. The autoencoder 101 has been trained using training data that includes features derived from genuine items. When features derived from a genuine item are input to the autoencoder, the autoencoder outputs features representing a genuine item. When features derived from a counterfeit item are input to the autoencoder, the autoencoder also outputs features representing what a genuine item corresponding to the counterfeit item would be. Input 111 is a genuine passport, and output 112 represents what a genuine passport would be for the input passport. In this case, since the input passport is genuine, the differences between the input passport and the output passport, if any, are minimal. Based on a review of the input passport 111 and the output passport 112, a manual determination may be made that the input passport 111 is genuine. The input passport 121 is a counterfeit passport, and the output passport 122 represents what a genuine passport would be for the counterfeit passport. In this case, since the input passport is counterfeit, the differences between the counterfeit passport and the output passport are significant. Based on a review of the input passport 121 and the output passport 122, a manual determination may be made that the input passport 121 is counterfeit.

Figure 2:
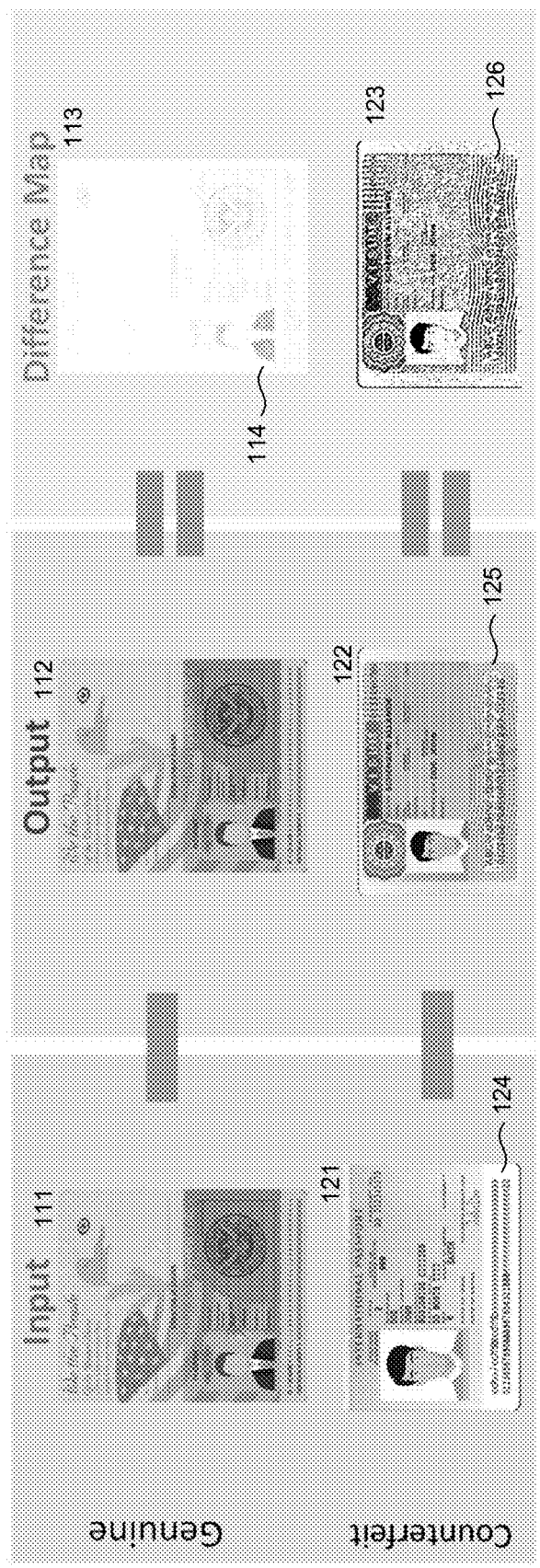
FIG. 2 is a block diagram that illustrates a difference map generated by the assessment system.

FIG. 2 is a block diagram that illustrates a difference map generated by the assessment system. A difference map 113 reflects the differences between the input passport 111 and the output passport 112. In this case, since the input passport 111 is genuine, the differences may relate primarily to the photo 114 of the passport holder. A difference map 123 reflects differences between input passport 121 and output passport 122. In this case, since the input passport 121 is counterfeit, the differences are significant. For example, the input passport 121 does not include letters and wavy lines at the bottom portion 124. The output passport 122, however, does include letters at the bottom portion 125. To reflect this difference, the difference map illustrates that the letters at the bottom portion 126 are missing from the input passport 121. The assessment system may also highlight the areas of the difference map that relate to an anti-counterfeiting measure.

Figure 3:
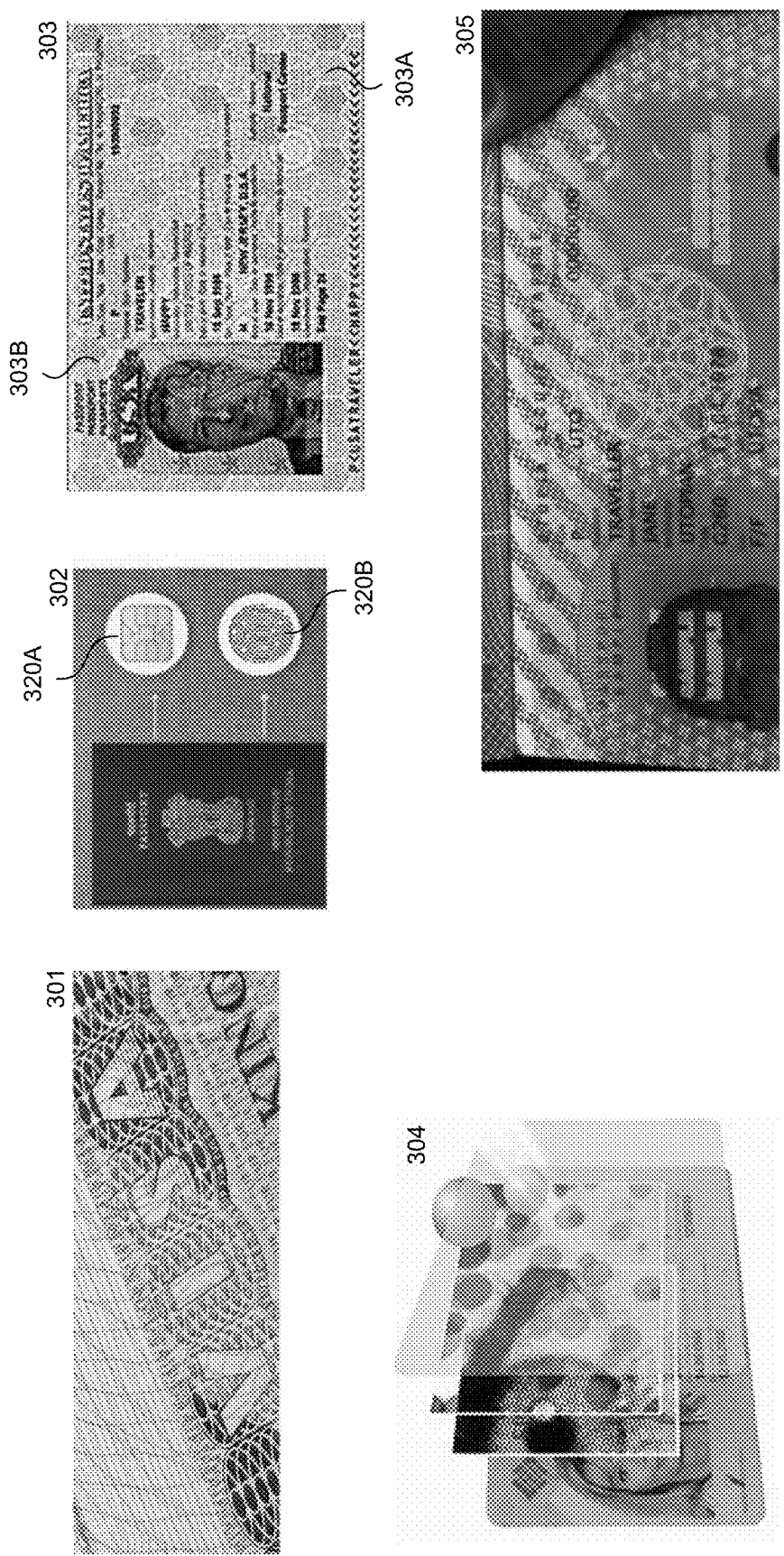
FIG. 3 is a block diagram that illustrates different types of anti-counterfeiting measures.

FIG. 3 is a block diagram that illustrates different types of anti-counterfeiting measures. Image 301 of a financial note illustrates an anti-counterfeiting measure that is a complex interlacing of lines. Image 302 of a passport illustrates anti-counterfeiting measures that are an RFID chip 302A and a fingerprint 302B. Image 303 of a passport illustrates an anti-counterfeiting measure that is a complex shading (or coloring) 303A and a seal (or stamp) 303B superimposed on a passport photo. Image 304 of an identification card illustrates anti-counterfeiting measures embedded in layers of the card. Image 305 of a passport illustrates anti-counterfeiting measures that are visible only by using light of a certain wavelength.

Figure 4:
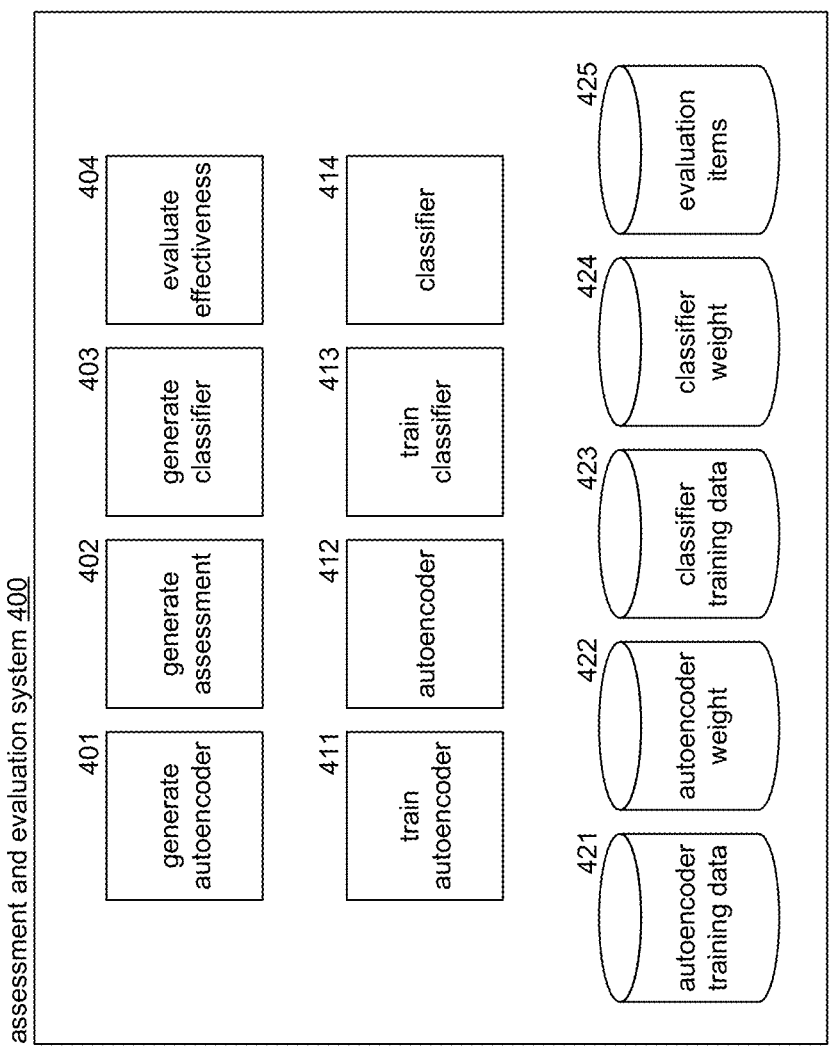
FIG. 4 is a block diagram that illustrates components of the A&E system in some embodiments.

FIG. 4 is a block diagram that illustrates components of the A&E system in some embodiments. The A&E system 400 includes components 401-404 that access the training components 411-414 and includes data stores 421-425. A generate autoencoder component 401 generates an autoencoder using the train autoencoder component 411 and the autoencoder training data 421 and stores the learned autoencoder weights 422. The generate assessment component 402 employs the autoencoder component 412 to assess whether a target item is genuine. The generate classifier component 403 uses the train classifier component 413 and the classifier training data 423 and stores the learned classifier weights 424. The evaluate effectiveness component 404 employs the classifier component 414 to evaluate the effectiveness of a target anti-counterfeiting measure based on evaluation items 425. The training component may be based on open-source code that is publicly available, such as that available from GitHub.

The computing systems on which the A&E system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the A&E system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The A&E system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the A&E system may be implemented in hardware using, for example, an application-specific integrated circuit (ASIC) or field programmable gate array (FPGA).

Figure 5:
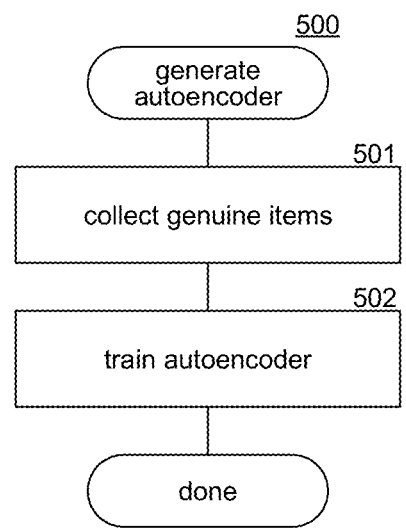
FIG. 5 is a flow diagram that illustrates the processing of a generate autoencoder component in some embodiments.

FIG. 5 is a flow diagram that illustrates the processing of a generate autoencoder component in some embodiments. The generate autoencoder component 500 is invoked to train the autoencoder using training data derived from genuine items. In block 501, the component collects features derived from genuine items such as passports determined by immigration officers to be genuine or passports known to be issued by an authorized passport service. In block 502, the component invokes the train autoencoder component to train the autoencoder using the collection of genuine items. The component then completes.

Figure 6:
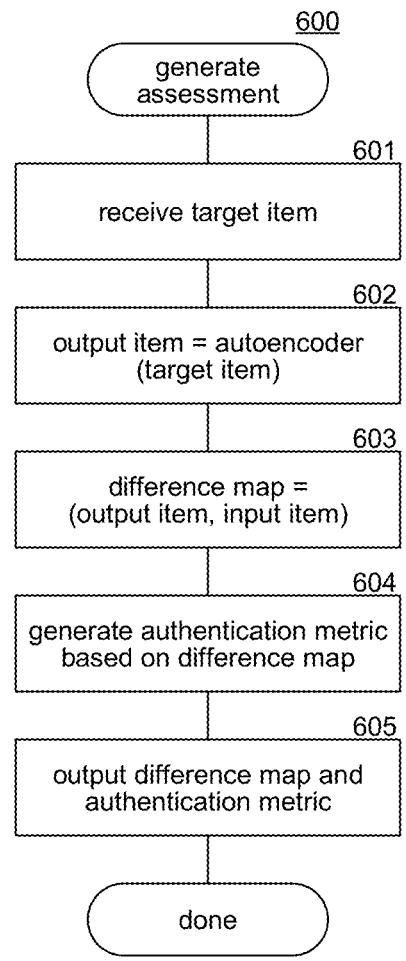
FIG. 6 is a flow diagram that illustrates the processing of a generate assessment component in some embodiments.

FIG. 6 is a flow diagram that illustrates the processing of a generate assessment component in some embodiments. The generate assessment component 600 assesses whether a target item is genuine. In block 601, the component receives the target item. In block 602, the component invokes the autoencoder component, passing features derived from the target item as the input item and receiving the output item representing a genuine target item corresponding to the target item. In block 603, the component generates a difference map based on the input item and the output item. In block 604, the component generates an authentication metric based on the difference map to indicate whether the target item is authentic. The authentication metric may be a probability that the target item is genuine. In block 605, the component outputs an indication of the difference map and an indication of the authentication metric to assist in assessing whether the target item is genuine. The component then completes.

Figure 7:
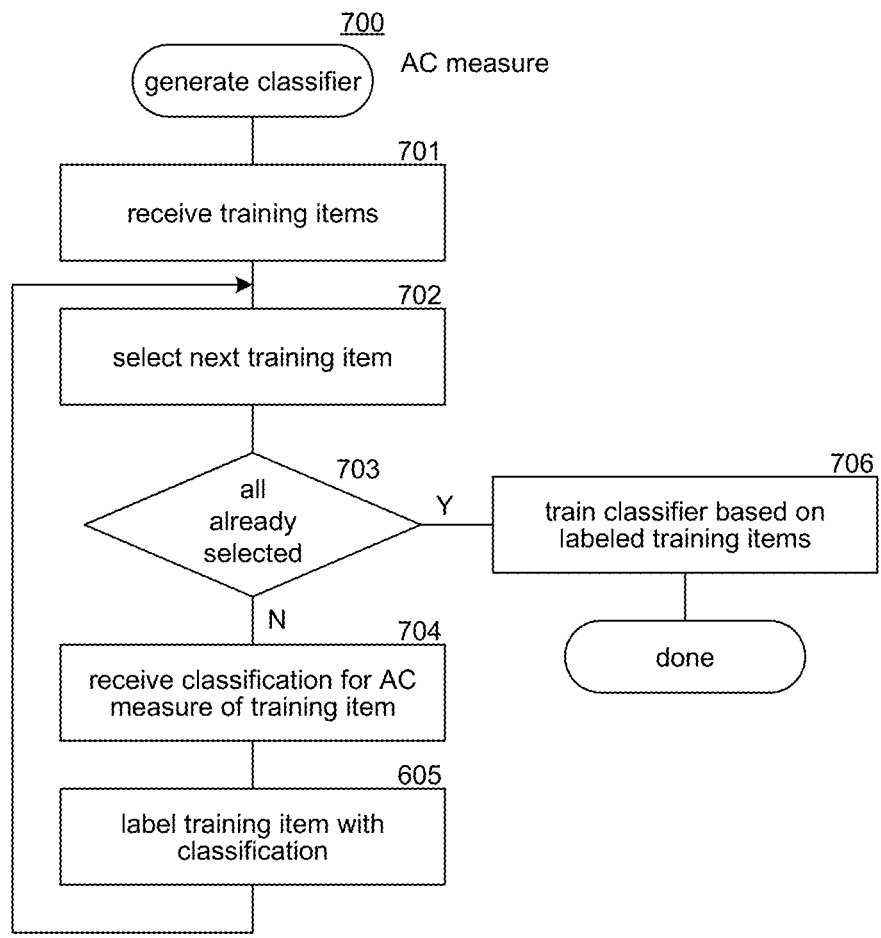
FIG. 7 is a flow diagram that illustrates the processing of a generate classifier in some embodiments.

FIG. 7 is a flow diagram that illustrates the processing of a generate classifier in some embodiments. The generate classifier 700 is invoked to generate a classifier to evaluate whether an anti-counterfeiting measure is effective. In block 701, the component receives training items. Although not illustrated, the component may derive features from the training items and employ those features when training the classifier. In block 702, the component selects the next training item. In decision block 703, if all training items have already been selected, then the component continues at block 706, else the component continues at block 704. In block 704, the component receives a classification for the anti-counterfeiting measure of the training item indicating whether the anti-counterfeiting measure is genuine. In block 705, the component labels the training item with the classification and loops to block 702 to select the next training item. In block 706, the component trains the classifier using the labeled training items and stores the learned weights. The component then completes.

Figure 8:
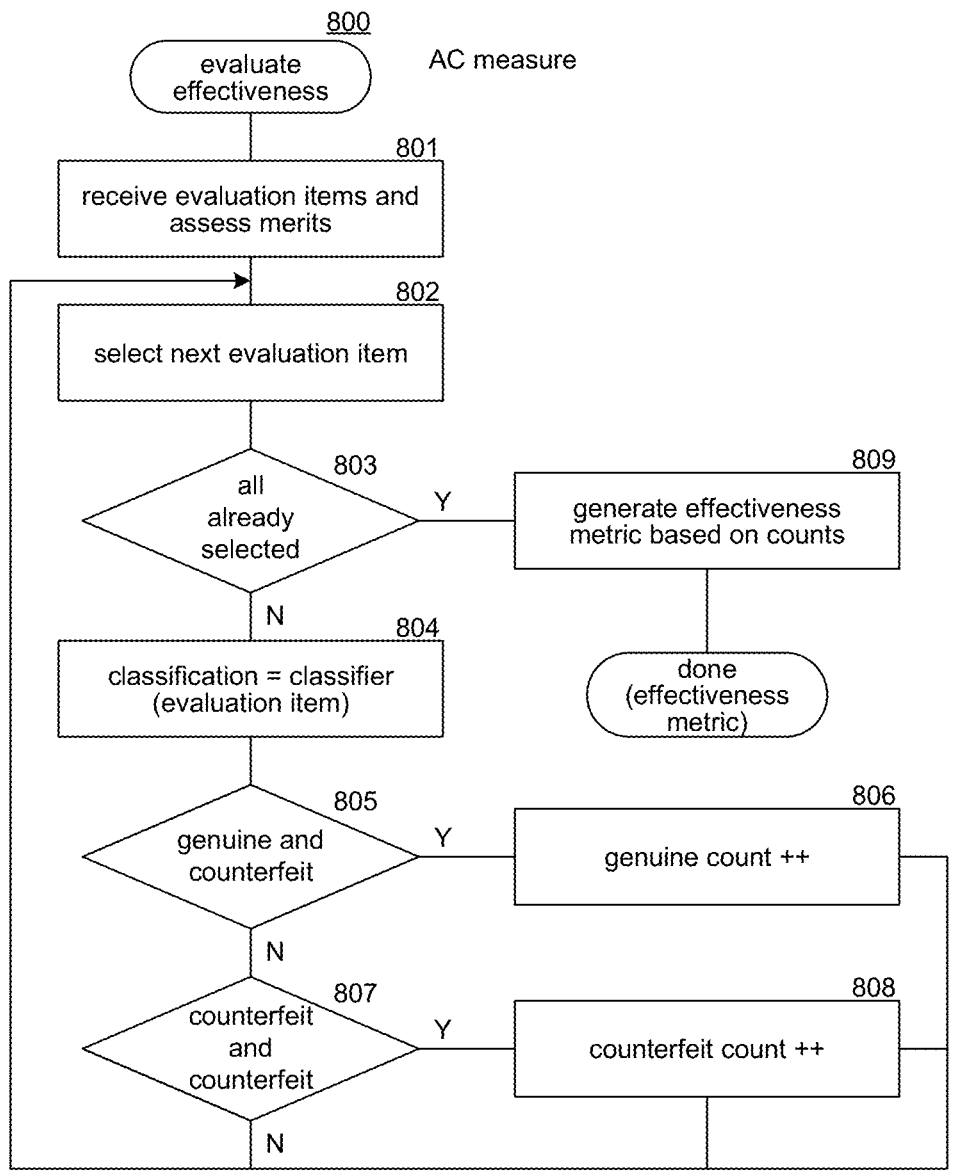
FIG. 8 is a flow diagram that illustrates the processing of an evaluate effectiveness component in some embodiments.

FIG. 8 is a flow diagram that illustrates the processing of an evaluate effectiveness component in some embodiments. The evaluate effectiveness component 800 is passed an indication of an anti-counterfeiting measure and evaluates the effectiveness of that anti-counterfeiting measure. In block 801, the component receives evaluation items and assessments of whether the evaluation items are genuine. For example, the evaluation items may be target items processed by the assessment system when in production such as at an immigration checkpoint. In block 802, the component selects the next evaluation item. In decision block 803, if all the evaluation items are already selected, then the component continues at block 809, else the component continues at block 804. In block 804, the component applies the classifier to the selected evaluation item to generate a classification. In decision block 805, if the evaluation item was assessed as genuine and the anti-counterfeiting measure is classified as counterfeit, then the component continues at block 806, else the component continues at block 807. In block 806, the component increments a genuine count of genuine evaluation items with a counterfeit anti-counterfeiting measure and then loops to block 802 to select the next evaluation item. In decision block 807, if the selected evaluation item is assessed as counterfeit and the anti-counterfeiting measure is classified as counterfeit, then the component continues at block 808, else the component loops to block 802 to select the next evaluation item. In block 808, the component increments a counterfeit count that indicates the number of counterfeit evaluation items with counterfeit anti-counterfeiting measures and then loops to block 802 to select the next evaluation item. In block 809, the component generates an effectiveness metric based on the counts to indicate the effectiveness of the anti-counterfeiting measure. The component then completes, outputting an indication of the effectiveness metric.

The following paragraphs describe various embodiments of aspects of the A&E system. An implementation of the A&E system may employ any combination of the embodiments. The processing described below may be performed by a computing device with a processor that executes computer-executable instructions stored on a computer-readable storage medium that implements the A&E system.

In some embodiments, a method performed by one or more computing systems is provided for assessing whether a target item is genuine. The method applies an autoencoder to one or more input features to generate one or more output feature. The one or more input features are derived from the target item. The autoencoder is trained using training data that includes the one or more input features derived from training items that are genuine. the method indicates that the one or more output features correspond to the one or more input features so that an assessment can be made as to whether differences between the one or more input features and the one or more output features indicate whether the target item is genuine. In some embodiments, an input feature is an image of at least a portion of the target item. In some embodiments, an input feature is a non-image feature derived from the target item. In some embodiments, the method further generates a difference map that indicates the differences between the one or more input features and the one or more output features. In some embodiments, the method further generates an authentication metric based on the difference map as an indication of whether the target item is authentic. In some embodiments, the method further, when the authentication metric satisfies an authentication criterion, indicates that the target item is genuine. In some embodiments, the method further outputs an indication of the difference map so that a person can assess whether the target item is authentic. In some embodiments, the method further generates an assessment of the effectiveness of the autoencoder at evaluating the effectiveness of an anti-counterfeiting measure. In some embodiments, the target item is designated as a counterfeit item when it is assessed to be not genuine. In some embodiments, the target item is designated as defective when it is assessed to be not genuine.

In some embodiments, a method performed by one or more computing systems is provided for evaluating the effectiveness of an anti-counterfeiting measure employed for an item. The method accesses one or more evaluation features derived from evaluation items that are assessed as genuine or counterfeit. The method, for each evaluation item, applies an evaluation classifier to the one or more evaluation features to generate an indication of whether the anti-counterfeiting measure of the evaluation item is counterfeit. The classifier is trained using training data that includes one or more training features of training items that are labeled based on whether the anti-counterfeiting measure of the training item is genuine. The method indicates whether the anti-counterfeiting measure is effective based on the number of evaluation items that are assessed as being genuine whose anti-counterfeiting measures are classified as being counterfeit. In some embodiments, the classifier is a convolutional neural network. In some embodiments, the evaluation items are assessed as being genuine or counterfeit based on an assessment system. In some embodiments, the effectiveness of the anti-counterfeiting measure is specific to the assessment system. In some embodiments, the assessment system employs an autoencoder. In some embodiments, the one or more evaluation features include an image of at least a portion of the evaluation item. In some embodiments, the one or more evaluation features include a non-image feature derived from the evaluation item. In some embodiments, the method further trains the classifier using training data that includes one or more features of training items that are labeled based on whether the anti-counterfeiting measure of the training items is genuine.

In some embodiments, one or more computing systems is provided for evaluating the effectiveness of an anti-counterfeiting measure employed for an item. The one or more computing systems include one or more computer-readable storage mediums for storing computer-executable instructions and one or more processors for executing the computer-executable instructions stored in the one or more computer-readable storage mediums. The instructions for controlling the one or more computing systems to, for each of a plurality of evaluation items, derive a feature from the evaluation item and apply a classifier to the evaluation feature to generate a classification as to whether the anti-counterfeiting measure of the evaluation item is counterfeit. The classifier is been trained using training data that includes, for each training item, a feature derived from that training item and a label indicating whether the anti-counterfeiting measure of the training item is genuine. The instructions for controlling the one or more computing systems to output an indication of whether the anti-counterfeiting measure is effective based on the evaluation items that are assessed as being genuine and whose anti-counterfeiting measures are classified as counterfeit. In some embodiments, the instructions further control the one or more computing systems to train the classifier.

In some embodiments, a method performed by one or more computing systems is provided for evaluating the effectiveness of an anti-counterfeiting measure employed for an item. The method, for each of a plurality of evaluation items, accesses a difference map indicating differences between the evaluation item and a corresponding genuine item. The corresponding genuine item generated based on a machine learning technique that inputs the evaluation item and outputs the corresponding genuine item. The differences relate to the anti-counterfeiting measure. Th method determines based on the difference map whether the evaluation item is a counterfeit anti-counterfeiting measure. The method indicates whether the anti-counterfeiting measure is effective based on evaluation items that have counterfeit anti-counterfeiting measures. In some embodiments, the anti-counterfeiting measure is indicated as effective based on counterfeit evaluation items having counterfeit anti-counterfeiting measures. In some embodiments, the anti-counterfeiting measure is indicated as ineffective based on genuine evaluation items having counterfeit anti-counterfeiting measures. In some embodiments, the machine learning technique is an autoencoder. In some embodiments, the difference map is based on one or more evaluation features that include an image of at least a portion of the evaluation item. In some embodiments, the difference map is based on one or more evaluation features that include a non-image feature derived from the evaluation item.

In some embodiments, a method performed by one or more computing systems is provided for evaluating the effectiveness of an anti-counterfeiting measure employed for an item. The method, for each of a plurality of evaluation items, accesses one or more features representing the evaluation item and an indication of whether the evaluation item is genuine or counterfeit. The method applies a clustering technique to the evaluation items to generate clusters of evaluation items that are similar. The method indicates whether the anti-counterfeiting measure is effective based on whether both genuine evaluation items and counterfeit evaluation items are in a cluster. In some embodiments, a feature is a difference map indicating differences between the evaluation item and a corresponding genuine item. The corresponding genuine item is generated based on a machine learning technique that inputs the evaluation item and outputs the corresponding genuine item, the differences relating to the anti-counterfeiting measure. In some embodiments, an evaluation item is identified as counterfeit based on the anti-counterfeiting measure being counterfeit.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing systems for evaluating the effectiveness of an anti-counterfeiting measure employed for a first item, the method comprising:
   accessing one or more evaluation features derived from evaluation items that are assessed as genuine or counterfeit;
   for each evaluation item, applying an evaluation classifier to the one or more evaluation features to generate an indication of whether the anti-counterfeiting measure of the evaluation item is counterfeit, the classifier having been trained using training data that includes one or more training features of training items that are labeled based on whether the anti-counterfeiting measure of the training item is genuine;
   counting a number of evaluation items that are assessed as being genuine whose anti-counterfeiting measures are classified as being counterfeit, to produce a count of evaluation items that are assessed as being genuine whose anti-counterfeiting measures are classified as being counterfeit;
   generating an effectiveness metric as an indication of whether the anti-counterfeiting measure is effective, based on the count of evaluation items that are assessed as being genuine whose anti-counterfeiting measures are classified as being counterfeit;
   making a determination of whether a second item is counterfeit based on an assessment of the second item and the effectiveness metric, wherein the assessment of the second item includes processing one or more input features of the second item with an autoencoder to generate one or more output features, the autoencoder having been trained using training data that includes the one or more input features from training items that are genuine, to set weights of the autoencoder;
   generating a difference map that indicates differences at a pixel level between the one or more input features and the one or more output features; and
   generating an authentication metric based on the difference map; and
   outputting an indication of the determination of whether the second item is counterfeit based on the authentication metric and the effectiveness metric.

2. The method of claim 1 wherein the classifier is a convolutional neural network.

3. The method of claim 1 wherein the evaluation items are assessed as being genuine or counterfeit based on an assessment system.

4. The method of claim 3 wherein the effectiveness of the anti-counterfeiting measure is specific to the assessment system.

5. The method of claim 1 wherein the one or more evaluation features include an image of at least a portion of the evaluation item.

6. The method of claim 1 wherein the one or more evaluation features include a non-image feature derived from the evaluation item.

7. The method of claim 1 further comprising training the classifier using training data that includes one or more features of training items that are labeled based on whether the anti-counterfeiting measure of the training items is genuine.

8. One or more computing systems for evaluating the effectiveness of an anti-counterfeiting measure employed for a first item, the one or more computing systems comprising:
   one or more computer-readable storage mediums for storing computer-executable instructions for controlling the one or more computing systems to:
   for each of a plurality of evaluation items,
   derive a feature from the evaluation item; and
   apply a classifier to the evaluation feature to generate a classification as to whether the anti-counterfeiting measure of the evaluation item is counterfeit, the classifier having been trained using training data that includes, for each training item, a feature derived from that training item and a label indicating whether the anti-counterfeiting measure of the training item is genuine;
   count a number of evaluation items that are assessed as being genuine whose anti-counterfeiting measures are classified as being counterfeit, to produce a count of evaluation items that are assessed as being genuine whose anti-counterfeiting measures are classified as being counterfeit;
   output an indication of whether the anti-counterfeiting measure is effective based on the count of evaluation items that are assessed as being genuine and whose anti- counterfeiting measures are classified as counterfeit;
   make a determination of whether a second item is counterfeit based on an assessment of the second item and an effectiveness metric, wherein the assessment of the second item includes processing one or more input features of the second item with an autoencoder to generate one or more output features, the autoencoder having been trained using training data that includes the one or more input features from training items that are genuine, to set weights of the autoencoder;
   generating a difference map that indicates differences at a pixel level between the one or more input features and the one or more output features; and
   generating an authentication metric based on the difference map; and
   output an indication of the determination of whether the second item is counterfeit based on the authentication metric and the effectiveness metric; and
   one or more processors for executing the computer-executable instructions stored in the one or more computer-readable storage mediums.

9. The one or more computing systems of claim 8 wherein the instructions further control the one or more computing systems to train the classifier.

* * * * *